July 13, 1926.

A. M. ELLIOTT 1,592,629

TIRE MAKING MACHINE

Filed July 24, 1924

INVENTOR.
Arthur M. Elliott,
BY

Geo. P. Kimmel

ATTORNEY.

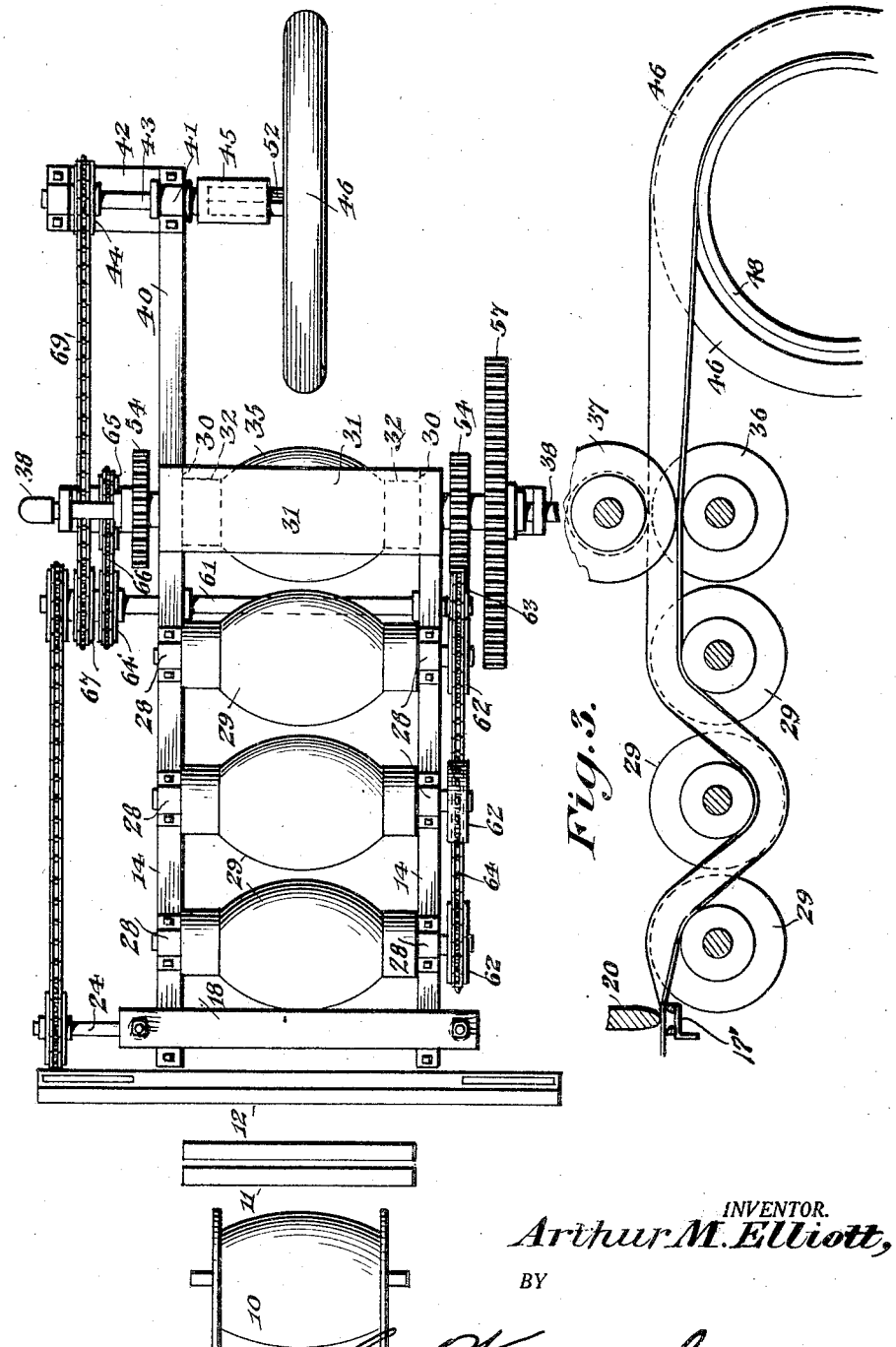

July 13, 1926.
A. M. ELLIOTT
TIRE MAKING MACHINE
Filed July 24, 1924
1,592,629
4 Sheets-Sheet 3
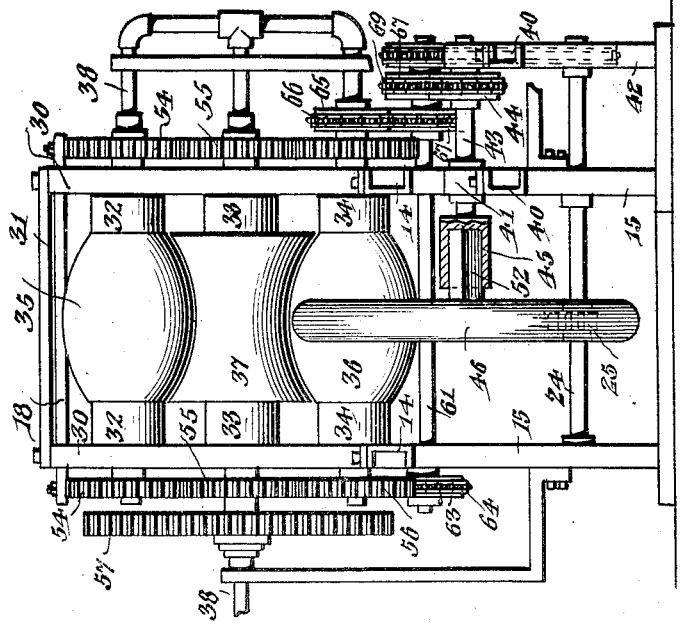
INVENTOR.
Arthur M. Elliott,
BY
Geo. P. Kimmel.
ATTORNEY.

July 13, 1926.
A. M. ELLIOTT
TIRE MAKING MACHINE
Filed July 24, 1924
1,592,629
4 Sheets-Sheet 4
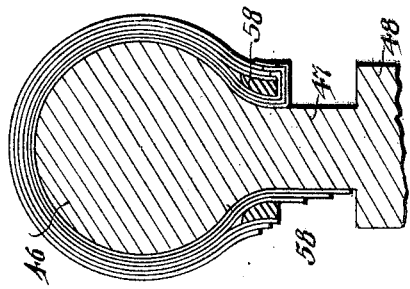
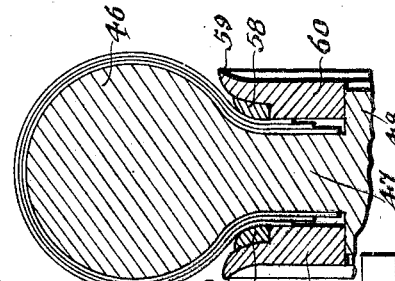
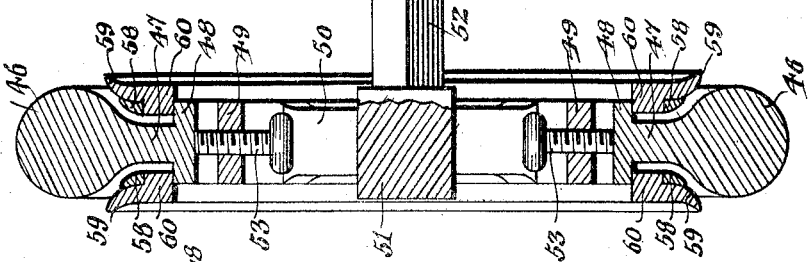
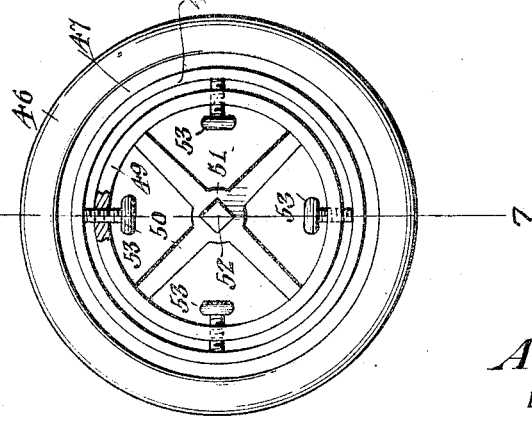
INVENTOR.
Arthur M. Elliott,
BY
Geo. F. Kimmel, ATTORNEY.

Patented July 13, 1926.

1,592,629

UNITED STATES PATENT OFFICE.

ARTHUR M. ELLIOTT, OF DEERFIELD, OHIO.

TIRE-MAKING MACHINE.

Application filed July 24, 1924. Serial No. 727,977.

This invention relates to the yieldable tires of vehicle wheels, more particularly to the wheels of motor driven vehicles, and has for one of its objects to simplify and improve the method by which the tire is constructed, and to simplify and improve the mechanism whereby the improved method is accomplished.

The method of constructing the improved tire consists in subjecting a fabric web to a stressing and flexing action to form the web into trough shape transversely, impregnating the web with an element capable of being vulcanized, for instance by the action of heated calendering rolls, enwrapping the impregnated web a plurality of times around a former or core, inserting clincher rings against the outer faces of the enwrapped webs when a predetermined number of layers of the fabric have been applied to the core, enwrapping the remaining layers around those previously applied and also externally of the inserted clincher rings, overlapping the edges of the enwrapped layers around the clincher rings, removing the incomplete tire from the core and subjecting it to the finishing and vulcanizing processes.

The mechanism whereby the variouss steps of the method above described is accomplished is illustrated in the drawings, in which—

Figure 2 is a plan view.

Figure 3 is a longitudinal section of a portion of the apparatus.

Figure 4 is an end elevation from the intake or feed end, and

Figure 5 is an end elevation from the discharge or core supporting end, partly in section.

Figure 6 is a side elevation of the core portion of the improved apparatus, reduced.

Figure 7 is a section enlarged on the line 7—7 of Figure 6.

Figure 8 is a detail illustrating the manner of coupling the heating medium of the calender rolls.

Figures 9 and 10 are details illustrating the manner of connecting the terminals of the layers of the fabric which forms the body of the tire around the clincher rings.

Figure 1:
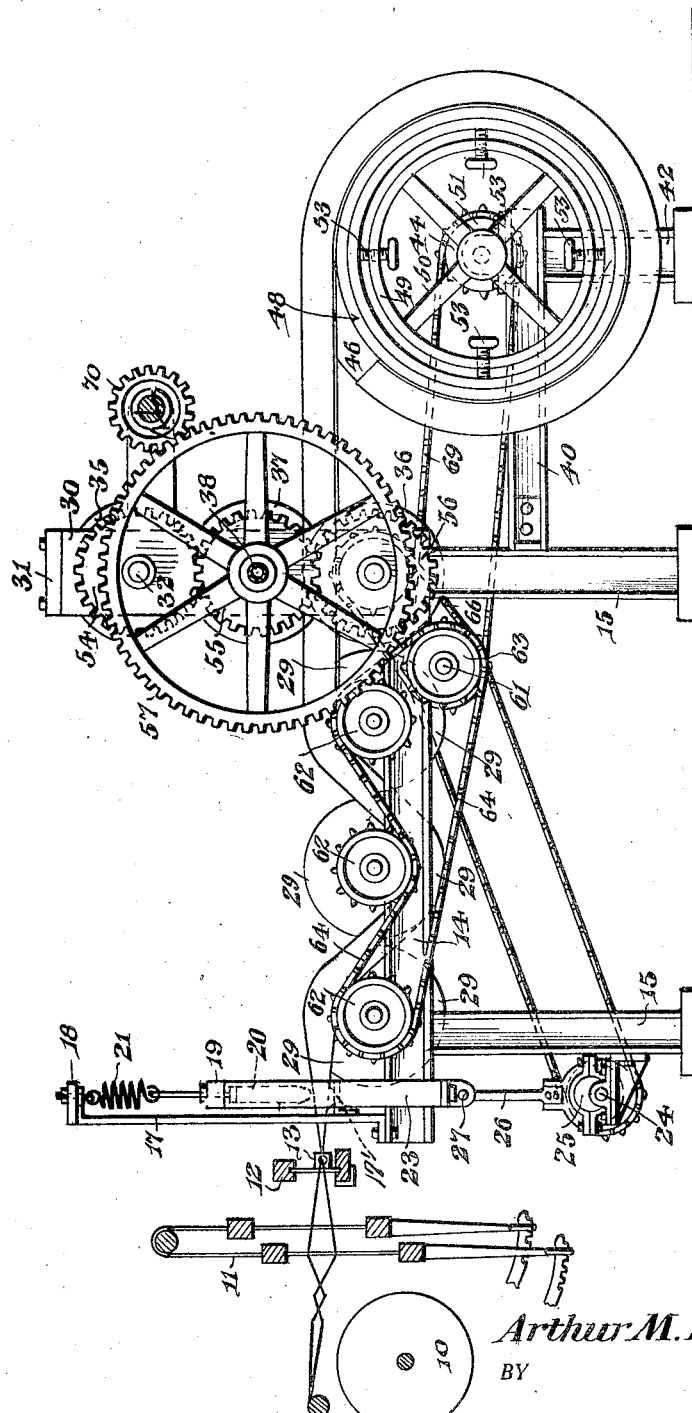
Figure 1 is a side elevation.

The fabric web may be produced by any suitable loom, but preferably the beam for the warp threads is formed larger at the center than at the ends as shown at 10 in Figure 2, so that the intermediate threads of the web will be stressed to a certain extent as they pass through the harness mechanism, indicated conventionally at 11, and thence to the reeds, and the shuttle, indicated conventionally at 12 and 13.

The specific mechanism employed to produce the improved tire includes a supporting frame formed of spaced side rails 14, and supporting legs 15.

Rising from the frame at one end are vertical guide members 17 and a connecting upper member 18. A head member 19 extends transversely of the vertical members 17 and carries a stressing blade 20, the latter coupled to the member 18 by springs 21 to yieldably hold the head member and its attached blade normally in upper and inoperative position.

Extending transversely beneath the frame members 14 is an operating member upturned at the ends as shown at 23 and connected to the head member 19, as shown. Mounted upon an opposite pair of the legs 15 is a shaft 24 and mounted on the shaft is a cam 25, and coupled to the cam and operative thereby is a connecting rod 26 with its free end coupled at 27 to the transverse member 23.

By this arrangement when the shaft 24 is rotated, the member 19 with its attached plate 20 will be reciprocated vertically.

Mounted upon the inner faces of the members 17 is a channelled or slotted member 17' through which the convex edge of the plate 20 extends when reciprocated, to force the fabric through the slot thus stressing it transversely as will be obvious.

Mounted in bearings 28 on the rails 14 are a plurality of convexed dolly rolls, 29.

Rising from the frame members 14 in advance of the dolly rolls are standards 30, coupled at their upper ends by a transverse tie member 31, and mounted for rotation in the standards are tubular shafts 32, 33 and 34, shafts 32 and 34 respectively carrying convexed calender rolls 35 and 36, and the intermediate shaft 33 carrying a concaved calender roll 37, co-operating with the convexed rolls as shown in Figure 5.

The calender rolls are provided with means for heating, for instance, steam or hot air pipes represented conventionally at 38.

When wound upon the convex beam 10 the outer warp threads are stressed to a greater extent or are shorter than the intermediate threads, and as the beam unwinds the intermediate longer threads are taken up by the stresser blade 20, which takes up the extra length of the intermediate threads and upon leaving the latter the web discloses unevenness, and in this condition is passed over the first dolly roll and under the second dolly roll and over the third dolly roll. This repeated and reversely curving of the web of fabric removes the unevenness and produces an even tension throughout both to the shorter and longer threads.

The vulcanizing compound, for instance rubber in plastic condition is applied to the fabric while passing through the calender rolls, the plastic rubber being supplied between the upper and intermediate rolls and fed thereby to the fabric as it passes between the intermediate and lower rolls and equalizing the thickness of coating.

Extending from one of the legs 15 is a supplemental frame member 40 and extending in advance of the standards 30, and mounted by a bearing 41 and a standard 42 on this extended frame portion is a counter shaft 43 having a chain pulley 44 and a socket element 45, as shown.

The socket 45 is designed to detachably support the core or former upon which the improved tire is completed, the latter comprising an annular body 46 conforming transversely to the interior of the tire as shown in Figures 7, 9 and 10.

Extending inwardly from the body is an annular web 47, the latter terminating in an annular laterally directed rib 48.

The core portion of the device likewise includes an annular inner member 49 connected by radial arms 50 to a hub 51, with a stud 52 of other form than round to engage in the socket 45. By this means the member 49, 50, 51 is detachably coupled to the stub shaft 43 and rotated therewith.

The annular rib 48 is larger in diameter than the annular member 49, and is adapted to be detachably coupled thereto by a plurality of combined spacing and set screws 53.

The shafts of the calender rolls 35, 36 and 37 are provided with interengaging gears 54, 55 and 56 while the shaft 33 is provided with a master gear 57.

The annular clincher rings are represented at 58, of the usual form, and associated with the latter are annular rings each formed with a portion 59 curved to correspond to the outer faces of the clincher rings, and with an annular inner part 60 bearing upon the outer faces of the annular ribs 48 as shown.

A counter shaft 61 extends transversely of the supporting frame below the line of the dolly rolls and of the calender rolls. Mounted on each of the shafts of the dolly rolls is a chain pulley 62, and mounted on the counter shaft 61 is a chain pulley 63 in alinement with the pulleys 62, and over which an endless chain 64 extends, as shown, and whereby the motion of the shaft 61 is transmitted to the outer dolly rolls in the same direction and the intermediate dolly roll in reverse direction.

The shaft 61 likewise carries a chain pulley 64' while the shaft of the lower calender roll 36 is provided with a like chain pulley 65, the pulleys to receive an endless chain 66 whereby the motion of the lower shaft 34 of the calender rolls is transmitted to the shaft 61.

The counter shaft 61 is provided with a chain pulley 67 in alinement with the chain pulley 44 on the shaft 43, the alined pulleys to receive an endless chain 69. Any suitable power may be employed to operate the master gear—for instance an electric motor gear indicated conventionally at 70, and by this arrangement all of the various movements are produced from master gear 57 as will be obvious.

With an apparatus thus constructed the various steps necessary to carry forward the improved tire building method are as follows:

The fabric web is initially in ribbon like form and stressed as before described by the form of the beam 10.

The web thus produced is first passed beneath the rapidly vibrating plate 20 by which it is further stressed and likewise curved transversely, or formed into upwardly opening trough like shape and passed over the first positively rotated convexed dolly roll where it is curved transversely with the concave side down and passed thence under the intermediate positively rotated convexed dolly roll by which the web is curved transversely with the concaved side up and passed thence over the third positively rotated convexed dolly roll whereby the web is curved transversely with the concaved side down. By positively rotating the dolly rolls, as shown, the stress is equalized and producing a uniform finish to the stressed fabric. The fabric web is then impregnated with a vulcanizing substance, such as rubber, as it passes through the calendering rolls and thence around the core 46' as many times as there are to be layers or plies in the completed tire.

When the stressed and impregnated fabric is enwrapped around the former or core in superposed relation, the edges will necessarily assume a steplike order, and after a certain number of the wrappings have been applied, for instance, one half of the total number of layers, the annular clincher rings will be disposed in place and the remainder of the layers applied over the rings, and the ends held by the plastic vulcanizing material. The portions of the layers of the fabric which are located next to the inner sides of the rings 51 are then turned outwardly over the adjacent edge of the layer next to the outer face of the ring and secured thereto in the same manner. The depending edges of the next inner layer of the fabric are then folded over the next outer layer and so on as illustrated at the left in Figure 10.

The tire thus far constructed is then subjected to vulcanizing and finishing operations, to complete the same.

The preferred embodiment of the invention is disclosed in the drawings and set forth in the specification, but it will be understood that modifications within the scope of the claimed invention may be made in the construction without departing from the principle of the invention or sacrificing any of its advantages.

What I claim as new is:—

1. In a machine of the class described, a supporting frame, a plurality of convex rolls mounted on said frame and over and beneath which a fabric web is adapted to be passed, means for positively rotating said rolls, a channelled member supported on said frame and over which said web is passed on its way to the said rolls, a stressing member movable toward and away from said channelled member, and means for intermittently operating said stressing member to force the web into the channelled member and stress the same in a direction opposite that in which it will be stressed by the adjacent first roll over which it passes.

2. In a machine of the class described, a supporting frame, a plurality of convex rolls mounted on said frame and over and beneath which a fabric web is adapted to be passed, means for positively rotating said rolls, a channelled member supported on said frame and over which said web is passed on its way to said rolls, an oblong frame movably supported, a stressing member attached to said oblong frame and movable therewith toward and away from said channelled member, and means for intermittently operating said oblong frame and the stressing member to cause the same to force the web into the channelled member and stress the same in a direction opposite that in which it will be stressed by the adjacent first roll over which it passes.

3. In a tire machine of the character set forth, a base frame, a plurality of horizontally arranged convex rolls thereon over and under which a fabric web is adapted to be passed, a pair of vertical supports upon one end of said frame, a channelled member supported thereby over which said web is adapted to pass, a movable frame structure arranged over the end of said base and resiliently supported by said supports, a plate supported by said movable frame and having a convex lower edge designed to pass through said member to stress said fabric transversely in a direction opposite to the direction in which it would be stressed by the adjacent convex roll, and power means connected with said movable frame for vertically reciprocating the same, and the plate attached thereto.

In testimony whereof, I affix my signature hereto.

ARTHUR M. ELLIOTT.